United States Patent Office 3,663,710
Patented May 16, 1972

3,663,710
METHODS AND COMPOSITIONS FOR IMPROVING FEED EFFICIENCY OF RUMINANTS USING BIS-POLYHALOMETHYL DERIVATIVES
Roger C. Parish, King of Prussia, and John E. Trei, Malvern, Pa., assignors to Smith Kline & French Laboratories, Philadelphia, Pa.
No Drawing. Filed Feb. 12, 1970, Ser. No. 10,981
Int. Cl. A61k 27/00
U.S. Cl. 424—301
16 Claims

ABSTRACT OF THE DISCLOSURE

Methods and compositions utilizing bis-polyhalomethyl derivatives improve the feed efficiency of commercial ruminant animals by inhibiting methanogenesis in the rumen. Preferred compounds to be used as active ingredient are hexachloroethane and trichloroethyl carbonate.

---

This invention comprises new ruminant feed compositions and new methods of improving feed efficiency in ruminants using various bis-polyhalomethyl derivatives as active ingredients.

The active ingredients of this invention are known chemical compounds which have never been described, to our knowledge, to have a beneficial effect on increasing the feed efficiency of ruminant animals. The term "bis-polyhalomethyl" is used in a generic sense to mean chemical compounds having two distinct polyhalomethyl groups ($CX_3$—) in their structures, most usually separated by a single linear bond or a chain type connection, carbon or otherwise. Examples of these structures are more fully described hereafter.

Analagous compounds with only one polyhalomethyl group such as $CCl_3C_6H_5$, $CCl_3COCH_3$, $CCl_3CHOHCH_3$, $CCl_3CH_2Cl$ have been found to be active in improving feed efficiency although somewhat less active than those disclosed hereafter as exemplary of this invention. The bis compounds generally are more active and have higher melting or boiling points.

Improvement of the feed efficiency of ruminant animals is an important commercial objective. If the cow or sheep grows more on the same or less feed, the cost of meat per pound to the farmer is decreased. In our copending applications, Ser. No. 881,868 filed Dec. 3, 1969, Ser. No. 881,915 filed Dec. 3, 1969, and Ser. No. 886,794 filed Dec. 19, 1969, to which reference under Rule 78 is given, we described our finding that various polyhalo acetaldehydes and alkamines as well as their derivatives improved the feed efficiency of ruminant animals without causing overt therapeutic activity or without inhibiting the overall fermentation activity of the rumen.

We have now found that bis-polyhalomethyl containing derivatives administered per os are extremely active in inhibition of methanogenesis in the rumen possibly by interrupting the methylcobalamine to methane plus vitamin $B_{12}$ cycle thereby conserving energy source mediators such as ATP for more productive work. The net effect in the rumen is to reduce the production of methane and to produce a higher ratio of the desirable fatty acids especially propionic and butyric acids. These are more readily utilized by the ruminant to increase the efficiency of rumen digestion of feed.

This discovery that bis-polyhalomethyl derivatives have activity in increasing the feed efficiency of ruminant animals by inhibiting methanogenesis has been confirmed using standard in vitro and in vivo tests. The activity is believed due to the polyhalomethyl portion of these structures and the preferred compounds to be used in this invention are those most easily prepared from inexpensive starting materials which have a high proportion of halogen content and which are not toxic or noxious to the animal at levels in feed compositions which demonstrate increased feed efficiency. The term, bis-polyhalomethyl derivatives, is used to represent $CX_3$—A—$CX_3$.

The polyhalomethyl derivatives of this invention are extremely active, many being active at levels of from 0.5 to 15 parts per million in vitro. The bis-polyhalomethyl ingredients used in the methods and compositions of this invention may be illustrated by the aforementioned structural formula:

$$CX_3\text{—}A\text{—}CX_3 \qquad (I)$$

in which:
X is hydrogen, fluoro, bromo or chloro, at least two of which in each polyhalomethyl (—$CX_3$) group are bromo or chloro; and
A is a single C—C bond, keto

phenylene, hydroxy-methylene

lower alkylene of 1–3 carbons especially methylene, halo, such as bromo, fluoro or chloro, substituted lower alkylene especially halo methylene, oxygen or bismethylene carbonyldioxy

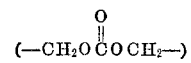

The two compounds, hexachloroethane and trichloroethyl carbonate, are extremely active, inexpensive and easy to prepare. These compounds are known to have other therapeutic activities at much higher doses than the levels at which they increase ruminant feed efficiency. For example, trichloroethyl carbonate is known to be a hypnotic sedative in humans at high dose levels. See C.A. 65, 19925, 60 15741.

The preferred hexachloroethane has been used against liver flukes also at very high levels such as 1 oz. per 100 lbs. in cattle and 1½ oz. per treatment in sheep. It is, of course, used as a drench not as a minor component of feed, see Merck Index (1968) page 526 or Veterinarians' Blue Book (1966) page 50. As will be noted hereafter, these doses are manyfold greater than the active levels useful in this invention.

It is recognized that the cost of the active chemical ingredient is most important since the purpose of this invention is to produce meat at lower cost per pound. Here, for example, hexachloroethane, a stable solid chemical, is commercially available in large quantities at 10–20 cents a pound. Also the active bis-polyhalomethyl ingredient must be stable in feed or premixes, palatable and not noxious to the animal. Certain of the active compounds disclosed as part of this invention are high boiling liquids. These are active in increasing ruminant feed efficiency but the stable solid chemicals are preferred for ease of use. The liquid members may be used by the farmer as part of a liquid premix to be added to feed just prior to feed time.

The known chemical ingredients of this invention are well known. References to certain examples of these and their chemical preparation are listed hereafter: CCl₃—CBr₃, C.A. 63 6834; CCl₃—CHCl₂, C.A. 65 5350; CCl₃—CBrCl₂, CBrCl₂—CBrCl₂, C.A. 59 10909; CBr₃—CHBr₂, C.A. 60 3657; CHBr₂CHBr₂, C.A. 62 697; CCl₃—CCl₂—CCl₃, CCl₃CHClCCl₃, CCl₃CCl₂CHCl₂, C.A. 65 5350; CCl₃CH₂CCl₃, C.A. 46 2480;

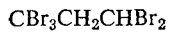

C.A. 68 44645; CCl₃C₆H₄CCl₃, C.A. 50 13088; CBr₃C₆H₄CBr₃, C.A. 64 15793; CCl₃C₆H₄(o)—CHCl₂, CHCl₂C₆CH₄(o)—CHCl₂, CCl₃C₆H₃(o)(CCl₃)₂, C.A. 49 14670; CCl₃COCCl₃, C.A. 55 21790; CBr₃COCBr₃, C.A. 45 6200; CBr₃COCHBr₂, C.A. 62 10328; CCl₃COCHCl₂, C.A. 60 13996; (CCl₃CH₂O)₂CO, C.A. 65 19925; (CBr₃CH₂O)₂CO, C.A. 31 7397; CCl₃CHOHCCl₃, C.A. 31 656; CHCl₂CHOHCHCl₂, C.A. 68 29077;

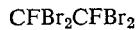

C.A. 53 17018; CCl₃CFCl₂, C.A. 29 5459; CBrCl₂CFClBr, C.A. 28 6103; CCl₃OCCl₃, Beilstein 3 18; CHBr₂SCHBr₂, C.A. 51 3435; CHCl₂OCHCl₂, C.A. 55 4350; CCl₃SCHCl₂, C.A. 47 5876 and others.

The chemical compounds of the art such as those outlined above are incorporated into feed or feed premix compositions in effective but nontoxic and nontherapeutic quantities which increase feed efficiency. The compositions are then fed to ruminant animals as usual in the agricultural art.

The ruminant feeds most generally used in conjunction with the method of this invention are either the roughage feeds such as silage or various commercial grain mixtures commonly used in ruminant animals, that is, in cattle or sheep. The amount of additive used to supplement such feeds will be an amount sufficient to improve the feed efficiency of the animal but not to have a pharmacodynamic or otherwise toxic or noxious effect. For example, in the broad range of about 2 g. to 2 kg. per ton of feed (about 0.0002–0.2%) preferably from about 50–600 g./ton. An average sheep will ingest about 3–4 lbs. of food daily. An average cow about 20–25 lbs. Therefore, the broad range of dosage for ruminants (sheep to cows) is roughly about 50 mg.–7 g. per day.

As a specific preferred example, hexachloroethane may be used at the rate of from about 50–200 g./ton of feed preferably about 80–150 g./ton. It will be seen that the amount of active ingredient ingested per day per ruminant is much lower than the therapeutic ranges noted here before.

For commercial use, the active ingredients are most readily used as premix formulations in which the chemical is distributed uniformly throughout a standard animal feed carrier in an amount to give active levels of chemical ingredient at tonnage amounts as described above when diluted to whole-feed. This premix or concentrate is mixed with either a normal or a special fattening diet of the ruminant as desired. Examples of such carriers are soybean meal, corn oil, ground corn, barley, wheat, mineral mixtures such as vermiculite, diatomaceous earth, corn gluten meal, corn distillers solubles or soyflour. The active ingredient will be in amounts to satisfy the criteria set forth above for whole feed. The active ingredient will usually be present in from about 5–75% by weight of the premix composition depending largely on the physical properties and activity of the active ingredient.

The animal feeds themselves may also contain cellulosic roughage such as cellulose, hay, straw, corn stalks, cotton seed hulls, oats, barley and cereal brans; natural oils such as animal fats, fish oils, safflower oil, peanut oil and cottonseed oil, antioxidants, minerals, vitamins; antibiotics; anthelmintics; and other appropriate medicaments.

A typical prepared animal feed is as follows:

Mixed hay: 40.0%
Ground yellow corn: 45.0%
Soybean oil meal: 7.0%
Cane molasses: 7.0%
Dicalcium phosphate: 0.5%
Trace minerals salt: .5%
Vitamin A: 300 I.U./lb.
Vitamin D: 150 I.U./lb.
Hexachloroethane: 100 g./ton of feed An example of a suitable premix is as follows:

Trichloroethylcarbonate: 200 g.
Ground yellow corn: to 3 lb.

Another might be a 10% mixture of hexachloroethane and vermiculite.

In the field the active ingredients may be administered by means of salt or molasses blocks. A typical block may be prepared using the following conditions:

| Ingredient: | Weight percent |
|---|---|
| Dried cane molasses | 44.54 |
| Ground soybean hulls | 24.90 |
| Trichloroethylcarbonate | 5.00 |
| Granulated salt | 21.59 |
| Trace minerals and vitamins | 0.20 |
| Stabilized animal fat | 1.11 |
| Moisture | 2.66 |

The method of this invention comprises allowing the cattle or sheep to graze or be fed ad libidum on the supplemented rations or to be hand fed on a regular schedule.

Normally we have feed efficiency increases of from about 10–15% using normal fattening diets and conditions.

The ability of the bis-polyhalomethyl derivatives of this invention to improve feed utilization in ruminants is primarily evaluated by means of a test which measures in vitro methane gas production plus total gas production as an indicator of the rate of fermentation of feedstuffs by microorganisms of the rumen. Rumen fluid is obtained from a fistulated animal and is filtered through six layers of cheesecloth. The fluid (75 ml.) is then added to 2.4 g. of experimental ration as substrate. Test compound is then added and the mixture is incubated for 3 hours. Test compound may be added as such or, particularly when used in quantities as small as 10 p.p.m. or less, suspended or dissolved in a solvent such as water or ethanol. At the end of the test period, the trapped gases are sampled by hypodermic needle from the flask and run through a gas partitioner (column chromatography) which separates and quantitates the components. The liquid (volatile fatty acids, etc.) are analyzed by gas liquid chromatography. Among the products measured are carbon dioxide, lactic acid, ethanol, hydrogen, ammonia nitrogen and fatty acids having from 2 to 6 carbon atoms. Reduction in the percent methane produced of 20% is considered significant. However, with compounds used in the present invention, reduction of 90–100% without reduction of overall fermentation is not uncommon. Ability of a particular compound to reduce the amount of methane generated without adversely reducing the overall rate of fermentation is determined by comparing the total ($\mu$moles/ml.) volatile fatty acids produced in control systems with those containing test compound. Also most significant is the distribution of fatty acids obtained.

The effect of the bis-polyhalomethyl derivatives of this invention in reducing methane production without causing a reduction in the rate of overall fermentation at effective concentrations, when tested by the above procedures, is shown by the data below.

A predetermined molar or percent concentration of test compound in water or ethanol was administered usually in 0.1, 0.5 or 1.0 cc. portions as described above. The data in Table I is for parts of active ingredient per amount of rumen fluid, i.e., parts per million with resulting significant methane inhibition. Generally speaking, 100 p.p.m. equals 0.01% of diet or 90.8 g./ton of feed.

TABLE I

| Compound | P.p.m. | Percent methane reduction |
|---|---|---|
| $CCl_3CCl_3$ | 24 | 100 |
| $CCl_3CCl_2CHCl_2$ | 13 | 90 |
|  | 65 | 100 |
| (p)$CCl_3C_6H_4CCl_3$ | 65 | 85 |
| $(CCl_3CH_2O)CO$ | 13 | 95 |
| $CCl_3COCCl_3$ | 130 | 100 |
| $CCl_3CHOHCCl_3$ | 65 | 90 |
| $CFCl_2COCCl_3$ | 130 | 95 |

The results of in vitro tests which correlate methane inhibition with a desired shift in ratio of fatty acid production in the rumen to the more efficiently utilized acids especially propionate is presented in Table II. This represents the analysis of rumen content evaluated statistically which results from the substantially complete inhibition of rumen methanogenesis by the derivatives noted above which is achievable using this invention.

TABLE II

|  | Molar percent | |
|---|---|---|
|  | Controls | Treated |
| $C_2$ fatty acids | 54–57 | 50–52 |
| $C_3$ fatty acids | 21–23 | 25–28 |
| $C_4$ fatty acids | 15–18 | 19–22 |
| $C_5$ or higher fatty acids | (1) | (1) |
| Total $\mu$ moles/ml | 68–72 | 67–74 |

¹ Remainder to 100%.

The in vitro data presented above was confirmed by specific in vivo tests as follows:

Each dose level represents a test group of four head of pinhole fistulated sheep. The animals were fed the additive mixed with morning and evening feed in quantities so that 90% ad libidum amounts were administered. The sheep would eat all the supplemented food in one hour. The results ran for a 7-day period.

Samples were withdrawn from the rumen 4–5 hours after the morning feeding and again 15–18 hours after the evening feeding. The ration was 90% roughage–10% concentrate. Analysis of the samples by gas partitioner and G.L.C. for gas and fatty acid content were carried out.

TABLE III
Hexachloroethane (90 mg./day)

| Molar percent | Control | Treated |
|---|---|---|
| $C_2$ | 76 | 68 |
| $C_3$ | 11 | 15 |
| $C_4$ | 9 | 14 |
| $C_5$ | 4 | 3 |
| Total $\mu$ moles/ml | 91 | 89 |

This data in sheep using hexachloroethane confirms the in vitro results present hereabove by showing the shift to $C_3$ and $C_4$ acids. At this low level the methane inhibition was only 25% complete. Even more dramatic results were realized at higher levels. In additional hexachloroethane studies in sheep, it was found that 360 mg./day/hd. yielded 70% reduction in methane at four hours post feeding and 40% reduction at eighteen hours post feeding.

TABLE IV
Trichloroethylcarbonate (144 mg./day)

| Molar percent | Control | Treated |
|---|---|---|
| $C_2$ | 78.6 | 66.4 |
| $C_3$ | 13.5 | 15.1 |
| $C_4$ | 6.0 | 16.5 |
| $C_5$ | 1.3 | 0.3 |
| Total $\mu$ moles/ml | 69.8 | 74.8 |

Methane inhibition was 60% complete in this treatment at four hours post feeding.

What we claim is:

1. The method for improving the feed utilization of ruminant animals comprising administering orally to such animals in a feed composition from about 50 mg. to about 7 g. per ruminant animal per day of a bispolyhalomethyl derivative of the formula:

$$CX_3-A-CX_3$$

in which:
X is hydrogen, fluoro, bromo or chloro at least two of which in each polyhalomethyl group are bromo or chloro; and
A is a single bond, keto, hydroxymethylene, methylene, halomethylene, phenylene, oxygen or bismethylene carbonyldioxy.

2. The method of claim 1 in which the quantity of bis-polyhalomethyl derivative is from about 2 g. to 2 kg. per ton of feed.

3. The method of claim 1 in which the quantity of active ingredient is from about 50–600 g. per ton of feed.

4. The method of claim 1 in which X is chloro.

5. The method of claim 1 in which X is chloro and A is a single bond, said compound being hexachloroethane.

6. The method of claim 5 in which the active ingredient is present in the feed at the rate of about 50–200 g./ton of feed.

7. The method of claim 1 in which X is chloro and A is bismethylenecarboxyldioxy, said compound being trichloroethyl carbonate.

8. The method of claim 7 in which the active ingredient is present in the feed at the rate of about 100–250 g./ton of feed.

9. The method of claim 1 in which A is a single bond.

10. The method of claim 1 in which A is hydroxymethylene.

11. The method of claim 1 in which A is methylene.

12. The method of claim 1 in which A is halomethylene.

13. The method of claim 1 in which A is phenylene.

14. The method of claim 1 in which A is oxygen.

15. The method of claim 1 in which A is bismethylene carbonyldioxy.

16. The method of claim 1 in which A is keto.

References Cited
UNITED STATES PATENTS 3,288,676   11/1966   Kauzal _____ 424—350

OTHER REFERENCES

Chemical Abstracts 60 (1964) 15741.
Chemical Abstracts 65 (1966) 19925.
Merck Index (1968) 526.

ALBERT T. MEYERS, Primary Examiner

F. E. WADDELL, Assistant Examiner

U.S. Cl. X.R.
424—331, 342, 343, 350, 353